United States Patent [19]
Wagner

[11] 3,930,301
[45] Jan. 6, 1976

[54] HEAVY MACHINE TOOL AND DEVICE FOR DEPOSITING AND PLACING A TOOL HEAD IN READINESS FOR USE

[75] Inventor: Hans O. Wagner, Buttgen-Vorst, Germany

[73] Assignee: Schiess Aktiengesellschaft, Dusseldorf-Oberkassel, Germany

[22] Filed: Mar. 19, 1973

[21] Appl. No.: 342,697

[30] Foreign Application Priority Data
Mar. 17, 1972 Germany.............................. 2212875

[52] U.S. Cl. .................. 29/568; 29/26 A; 90/11 A; 90/17
[51] Int. Cl.² .......................................... B23Q 3/157
[58] Field of Search ........... 29/26 A, 568; 279/1 TS; 90/17, 11 A, 11 R

[56] References Cited
UNITED STATES PATENTS

| | | | |
|---|---|---|---|
| 3,249,997 | 5/1966 | Hutchens.............................. | 29/568 |
| 3,650,018 | 3/1972 | Perry et al. ........................... | 29/568 |
| 3,709,623 | 1/1973 | Stephan et al. ...................... | 29/26 A |
| 3,757,637 | 9/1973 | Eich et al............................... | 90/17 |

Primary Examiner—Frank T. Yost
Assistant Examiner—Z. R. Bilinsky
Attorney, Agent, or Firm—Walter Becker

[57] ABSTRACT

A heavy machine tool, especially drilling and milling machine, which has a head stock with a supporting sleeve therein for receiving a boring spindle and a pull rod operable chucking device for chucking a tool head, and which also includes a device for depositing tool heads and placing the same in readiness for use. The housing for the tool head has on its outside a circular groove located at the side of the head stock in a plane which is located perpendicular to the axis of the boring spindle while within the range of movement of the tool head there is provided at least one device for depositing a tool and placing the same in readiness for use which last mentioned device includes a vertically arranged deposit plate the upper edge of which corresponds in shape to the shape of the arc of the annular groove and has a thickness corresponding to the width of said groove and upon which the tool head is adapted to be deposited by means of said annular groove, said range of movement of the respective tool head being determined by the displacement of said head stock, of said supporting sleeve, and/or the respective tool head.

15 Claims, 17 Drawing Figures

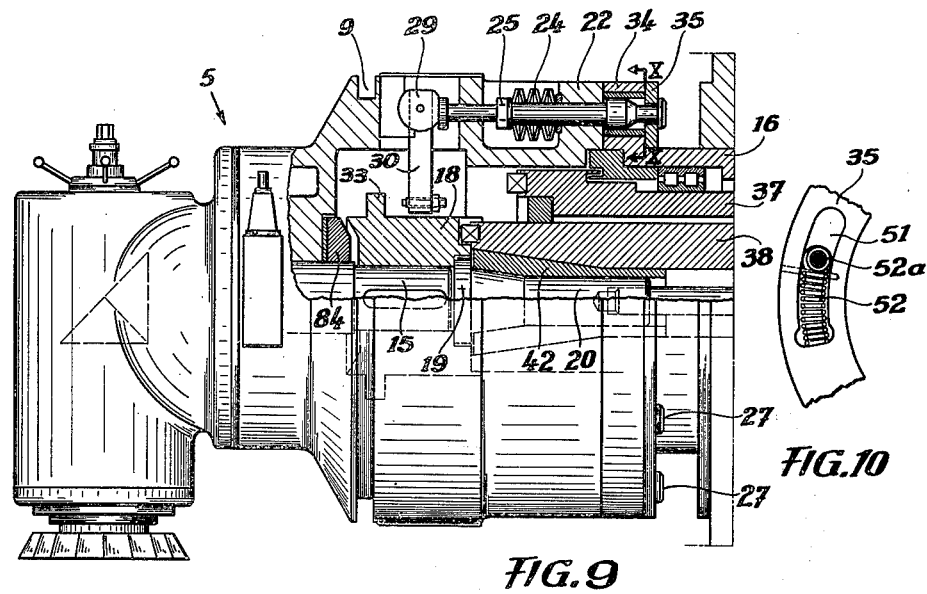
FIG. 9
FIG. 10
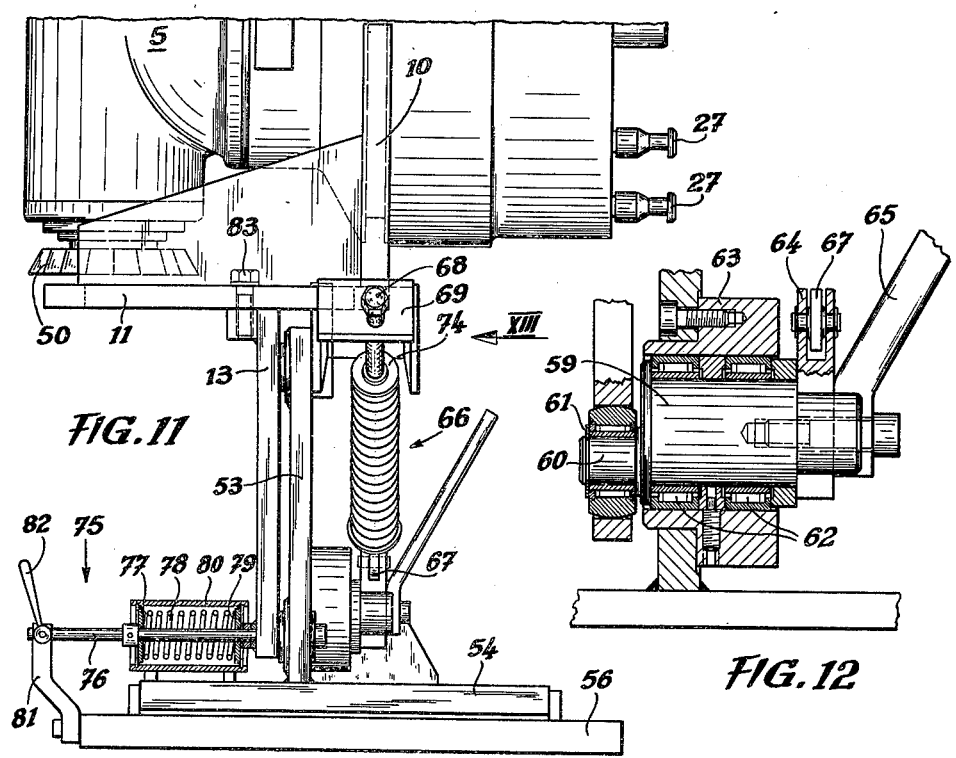
FIG. 11
FIG. 12

HEAVY MACHINE TOOL AND DEVICE FOR DEPOSITING AND PLACING A TOOL HEAD IN READINESS FOR USE

The invention relates to a heavy machine tool with means for placing at disposal or depositing a tool head.

It is known to equip machine tools, especially those with numerical control, with so-called tool changers. Among these are machine tools which pick up those tools needed for consecutive machining operations on a workpiece. The spindle carriers or supporting sleeves of such machines are so constructed and controlled in their movements that in case of a required tool change they automatically take the chucked tool to the tool changer where they deposit the tool, whereupon the next required tool is picked up, chucked and subsequently moved to the machining station for the next operation.

In heavy machine tools, particularly boring and milling machines, in the spindle box of which there is mounted a supporting or carrier sleeve which in its turn has arranged therein a boring spindle as well as a pull rod operated chucking device for the chucking of a tool head, the use of tool changers of the known type is not possible because of the heavy weight of the tool heads. In such machines, as a rule, it is not just a case, for example, of changing a single cutting tool but rather of changing a complete tool head with a plurality of tools. The placing in readiness of such tools and connecting them to the carrier sleeve of the boring head or spindle housing has therefore been done by taking the respective cutter head to be exchanged off the carrier sleeve, by holding it by means of a crane and then transporting it to a tool storage area from where the next required cutter or tool head is lifted and, again by use of a crane, brought to the boring head or spindle housing and coupled to the carrier sleeve. On such machines there has been needed a considerable expenditure of time and labor to move the cutter head by crane and to effect its manual connection to or disconnection from the carrier sleeve.

It is, therefore, an object of the present invention to provide a heavy machine tool with means whereby it is possible automatically to undertake the operations of picking up or putting down a tool head as well as, preferably, its clamping to or unclamping from a carrier sleeve of a boring head or spindle housing. It is thus also possible to allow not only the machine operations, but also the tool changing sequence, to proceed automatically.

According to the invention, a heavy machine tool, in particular a boring and milling machine, having a head stock box with a supporting sleeve therein in which are arranged a boring spindle and a pull bar operated chucking device for the chucking of a tool head, while means are provided for placing at disposal or into readiness or for depositing tool heads, is characterized primarily in that the tool head has a housing the exterior of which, at the side of the head stock, is provided with a circular groove located in a plane perpendicular to the axis of rotation of the boring spindle, and is furthermore characterized in that, within the limits of the range of movement of the tool head determined by the displacement of the head stock, the carrier sleeve and/or the stand, there is arranged at least one device for depositing the tools and placing them into position for use, which device comprises a vertical receiving plate, the upper edge of which is as to shape identical to the circular shape of the aforesaid annular groove and has a thickness corresponding to the width of the said groove and on which the tool head can be mounted by means of said groove.

There is thus provided a device for placing tools in readiness and depositing them in a form suitable for application to a heavy machine tool on which the tool head is deposited in that position in which it is also held by the carrier sleeve of the head stock. Furthermore, since the device is located within the range of movement of the carrier sleeve, it is possible for the tool head to be moved to said device from the area where it has been machining the workpiece, or to make a corresponding opposite movement by displacement of the head stock, the carrier sleeve and/or the stand, so that all movements needed for a tool head change can be numerically controlled.

According to a further development of the invention, the receiving plate is held resiliently displaceable in its own plane within certain limits in order to assure centering and alignment of said plate with the boring spindle axis and permitting correction of any small misalignment of the spindle axis relative to said device which misalignments are unavoidable in view of the great weights involved.

A resiliently displaceable mounting of the receiving or deposit plate may be realized by supporting said plate on a horizontal bearing pin which is located eccentrically with regard to the axis of rotation of a bearing pivot and on the latter. This bearing pin is acted upon by a spring by means of a lever. The magnitude of the spring force corresponds to the weight of a tool head to be received by the deposit plate. In this way a resiliently displaceable mounting will be assured which at the same time acts like a counterweight inasmuch as the deposit plate, while being resiliently yieldable, is in view of the eccentric mounting on the bearing pivot always automatically returned to a central starting level. The resilient deviating movement thus occurs along a small arc. Thus, with different weights of tool heads, the deposit plate will not against the thrust of a spring move downwardly to different extents, but the spring force becomes effective along an arc and brings about an oppositely directed movement of said plate.

More specifically, according to the present invention, a lever may be fixedly connected to the bearing pin. The downward pivoting stroke of the lever is limited by an abutment while the lever is pivotable in opposite direction against the thrust of a spring. In view of the abutment, a certain starting position of the bearing pin and thereby also of the bearing pivot eccentrically located thereon is fixed from which the deviating movement of the deposit plate against the thrust of the spring is effected along a circular arc under the load of a tool head mounted thereon.

According to a further development of the invention, the deposit plate may be connected to a bracket plate extending in a plane parallel to the deposit plate so as to be displaceable and arrestable relative thereto. Parallel to the bracket plate there is provided a stand plate in which the bearing pin is journalled on which latter the bracket plate rests eccentrically, and at the same time is guided in its parallel position with regard to the stand plate by connecting bolts. These connecting bolts extend with play through the stand plate. The fact that the deposit plate is displaceable in a direction transverse to the bracket plate supporting same makes it possible so to adjust the bracket plate that the center of gravity of the tool head to be received by the deposit plate will be located in the plane of the bracket plate and thereby also approximately in the vertical plane extending through the eccentrically provided bearing pivot. In this way a rugged construction is obtained which will assure the resilient mounting of the deposit plate and the support of heavy weights.

According to a further feature of the invention the stand plate may be supported by a horizontal ground plate which in its turn is displaceable on a base plate in a direction transverse to the plane of the deposit plate and is adjustable with regard to the boring spindle axis in conformity with the tool head so that in this way the deposit plate is movable in a direction perpendicular to its plane. Consequently the deposit plate can automatically adapt itself to the movements of the tool head perpendicularly with regard to the deposit plate when the tool head is connected to the supporting or carrier sleeve.

In this way, according to the invention, the ground plate may against the thrust of the spring be moved in the direction of the outward movement of the carrier sleeve and in a direction opposite thereto under the thrust of the spring in a direction perpendicular to the plane of the deposit plate and relative to the base plate so that the deposit plate can to a certain extent deviate perpendicularly with regard to its plane in order to facilitate or permit the cooperation of the rim of the deposit plate and the annular groove in the tool head as well as the engagement and disengagement of the tool head with and from the carrier sleeve.

According to a further development of the invention, a plurality of devices for the tool deposit and the placing of the tool in readiness for use with deposit plate may be arranged on a turntable so that by turning the turntable that tool head or that deposit plate may be moved into a position in which the picking up of a tool head or the deposit of a tool head can be carried out. The arrangement of a turntable for receiving the devices for the deposit of the tools or for the placing of the tools in readiness for use brings about the advantage that the headstock, the carrier sleeve and/or the stand of the machine are to this end to be moved into the same position in which the respective part is associated or aligned with the tool head for picking up the same or with the deposit plate for depositing the tool head thereon.

According to a further development of the invention, in addition to the devices for depositing the tool or placing the same into readiness for use, there may be provided a tool magazine so that a loading of the tool heads can be effected directly therefrom when a tool exchange is required.

In this connection, according to a further development of the invention, the tool magazine may have associated therewith a lifting device with pivotable supporting arm for the transport of tools to the devices for the tool deposit and placing in readiness of the tools and vice versa so that also the exchange of tools can be mechanized to a major extent so that at least the transfer of the tools by hand will be obviated.

In order to permit an automatic pick-up and chucking of a tool head to the carrier sleeve, the machine according to the present invention is characterized primarily in that the drive shaft for the milling head is adapted to be coupled to the boring spindle by means of a follower flange which is non-rotatably but axially displaceably mounted on the drive shaft and is adapted to be chucked by a pull rod known per se with chucking device while at the same time chucking bolts supported by the housing of the tool head are adapted to be brought into engagement with the carrier sleeve to be chucked thereto.

Whereas with this embodiment the boring spindle with the pull rod brings about the central coupling of boring spindle and drive shaft of the tool head to each other, the chucking bolts chuck the tool head to the carrier sleeve.

To this end, the carrier sleeve may have its free end provided with an annular flange which is engaged at the headstock side by a clamping ring. The chucking bolts which are provided with counter bearing heads have associated therewith passages which are arranged in the annular flange. The clamping ring has slots therethrough which are aligned with these passages and which have such a shape that, by turning the clamping ring after the counter bearing heads extend therethrough, the chucking bolts form a portion of a bayonet joint so that a fixed connection between carrier sleeve and tool head will be assured.

According to a further development of this design, the clamping bolts may against the thrust of a spring be slightly movable outwardly toward the headstock. To this end, a lever engages those ends which extend into the tool head. This lever will, in response to a longitudinal displacement of the follower flange by the boring spindle on the drive shaft of the tool head, be subjected to a tilting movement which brings about a displacement of the chucking bolt in the direction toward the headstock. If the pivot movement of the lever and thus the displacement of the clamping bolt is to be reversed and if prior thereto the clamping ring is turned correspondingly, the counter bearing heads will engage the clamping ring and will permit a displacement of the tool head, in other words, a pulling out of the clamping bolt, only when the clamping ring has been turned back correspondingly. The clamping force as such is effected by the springs engaging the clamping bolts. The force of these springs is for loosening the clamping bolts overcome by pivoting the lever which latter is pivoted by the longitudinal displacement of the follower flange on the drive shaft for the tool head.

According to a further feature of the invention, the clamping ring may be subjected to a spring force which brings about an automatic turning of the clamping ring into its locking position with the clamping bolt so that the disengaging operation will make it necessary that this spring force be overcome. Consequently, it will be assured that the clamping ring cannot accidentally move into its disengaging position.

The invention is illustrated by way of example in the accompanying drawings, in which:

FIG. 9 shows the tool head in connection with the carrier sleeve in its working position.

FIG. 10 illustrates a section taken along the line X — X of FIG. 9, but on a larger scale than that of FIG. 9.

FIG. 11 is a side view and partially a section through a device for placing the tool head in readiness for use and for depositing the tool head and shows the tool head in deposited position.

FIG. 12 is a partial section through FIG. 11 in the region of the adjusting eccentric.

Figure 16:
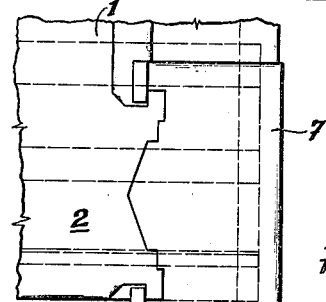
FIG. 16 is a partial top view of the workpiece chucking table and illustrates the devices mounted on a turntable for the depositing of the tool heads and placing the same in readiness for use, and also shows the machine stand in its tool exchanging position.
Figure 17:
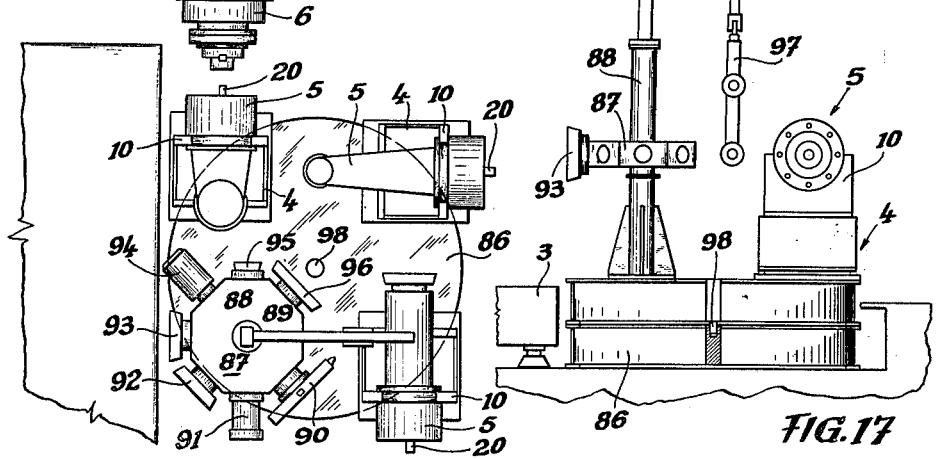

FIG. 17 diagrammatically illustrates the turntable of FIG. 16 in view and partially in section.

Figure 1:
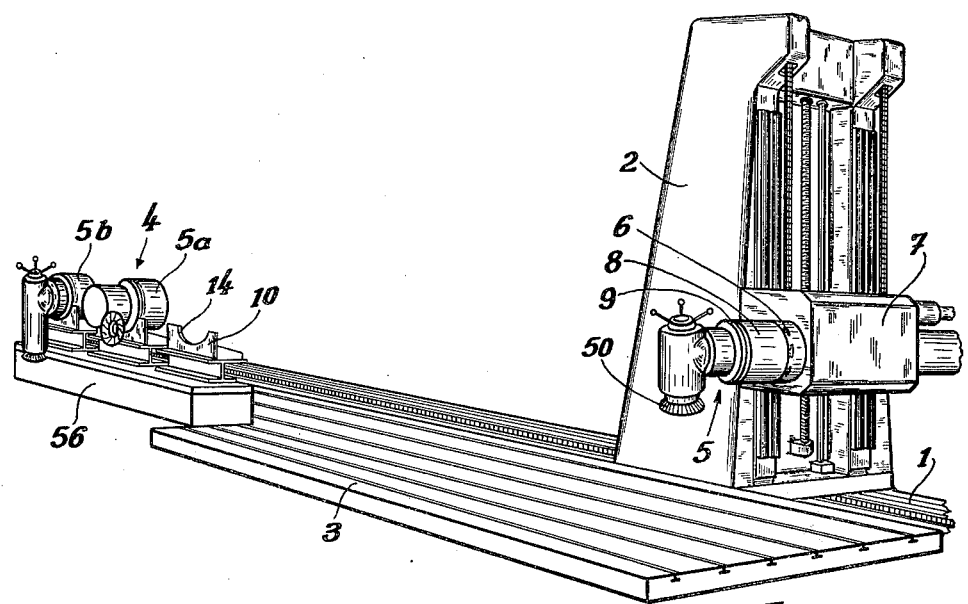
FIG. 1 is a perspective view of a heavy drilling and milling machine with associated devices for moving the tool heads into their position ready for use and depositing the tool heads.

Referring now to the drawings in detail, FIG. 1 shows a heavy drilling and milling machine which is primarily composed of the stand bed 1, the stand 2 longitudinally displaceable on the bed 1, and the workpiece chucking plate 13 extending along the bed 1, and also shows devices 4 for placing tool heads into readiness for use and depositing tool heads.

On that side of the chucking plate 3 which faces away from the stand 2, three devices 4 are arranged adjacent to each other on a stationary base plate 56. That one of the devices 4 which is in front is in a condition for receiving a tool head 5 which at this time is connected to the carrier sleeve 6 of the headstock 7. The next following device 4 carries another tool head, namely the tool head 5a, which is provided with a laterally angled off milling head. The third device 4 carries an angled milling head 5b which is of a different design.

In conformity with FIG. 1, the tool head 5 designed as an angled milling head has a carrier sleeve generallyy designated 6 connected to its free end. This sleeve 6 is longitudinally displaceably mounted in the headstock 7 which in its turn is supported by the stand 2 so as to be movable upwardly and downwardly. Such a structure is known so that a further discussion of the drives illustrated in the drawings for the various movements does not appear to be necessary. The drawings clearly bring out that the stand 2 is so displaceable that it can be moved into a position in which the tool head occupies a position associated with one of the devices 4 and can be moved transverse to the chucking plate 3 toward the latter by moving the carrier sleeve 6 out of the headstock 7.

Figures 2, 3:
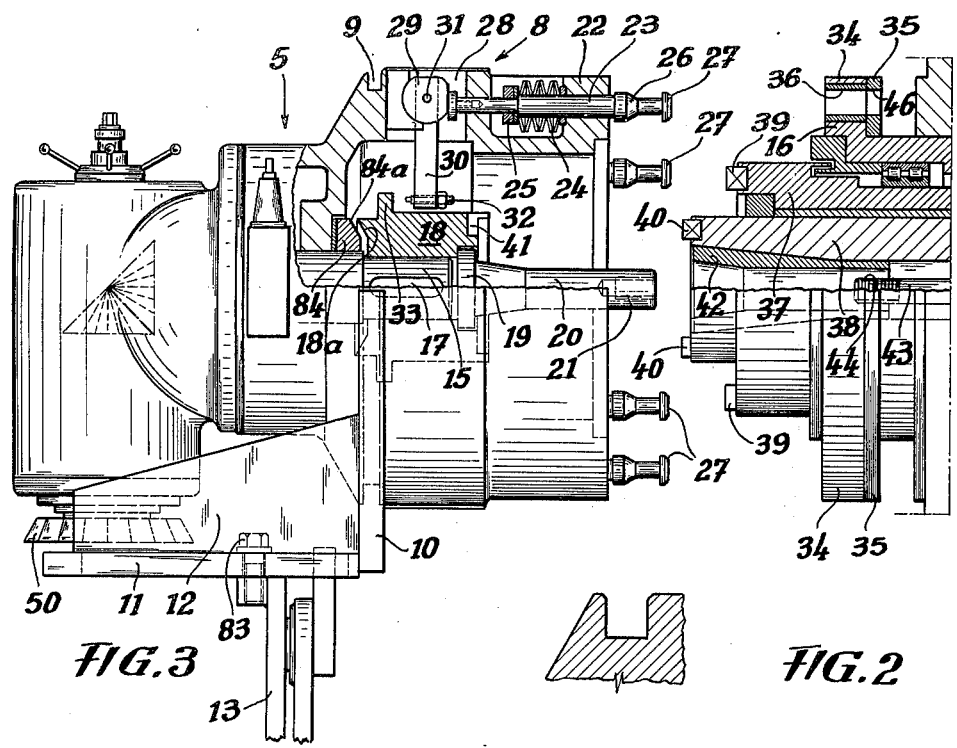
FIG. 2 is a side view, partially in section, showing the connecting end of the carrier sleeve with boring spindle in the headstock.
FIG. 3 is a side view, partially in section, of a tool head associated with the carrier sleeve of FIG. 2, the tool head being shown in that position in which it is held in a device for placing the tool head in readiness for use and for depositing the tool head.

When the carrier sleeve 6 is moved outwardly in this way, the tool head 5 can, in conformity with FIG. 3, be deposited upon one of the devices 4 or, when resetting the machine, can be lifted therefrom. To this end, a groove 9 is provided along a circular arc in the housing 8 of the tool head 5. The width of groove 9 corresponds to the thickness of the upper marginal strip 14 of the deposit place 10 which forms a part of the devices 4 for placing the tool heads into readiness for use and for depositing the tool heads. The deposit plate 10 is welded to the plate 11 extending in horizontal direction and also to reinforcing ribs 12. By means of a screws 83 which extend through oblong holes, the deposit plate 10 is connected to the bracket plate 13. This screw connection permits a displacement of plate 10 with regard to plate 13 in such a way that the center of gravity of the tool head for which the depositing device is provided will be located approximately in the plane of the bracket plate 13. The bracket plate 13 is so arranged that movements in its plane will be possible in upward and downward direction as well as toward both sides and also perpendicularly with regard to the plane of the plate 13. In this way, the plate 10 will be able automatically with its semicircular marginal strip 14 to adjust itself in conformity with the circular arc of groove 9 in the tool head 5 if, when the tool head 5 is deposited upon the plate 10, a slight deviation of the position of tool head 5 with regard to plate 10 should occur. This deviation in position can be corrected by a corresponding displacement of plate 10 in its plane so that the marginal strip 14 will engage the groove 9 the width of which corresponds to the thickness of the marginal strip 14 of plate 10. With this cooperation of plate 10 and tool head 5, the latter is, in conformity with FIG. 3, caught by the deposit plate 10 or device 4 and is held in a position corresponding to its own weight so that later a pick-up of the tool head 5 by the carrier sleeve 6 of the headstock 7 will not cause any difficulties. This is due to the fact that the axis of the tool head 5 extends nearly precisely in the same direction as the axis of rotation of the working spindle or carrier sleeve 6 which again has to pick up the tool head 5 and disengages the same by a vertical lifting movement from the device 4.

As will be seen from the drawings, the tool head 5 represents an angled milling head of customary design which differs from heretofore known elements by those structural elements which are used for chucking and locking with the carrier sleeve 6 the end face of which is correspondingly equipped.

According to FIG. 3, the tool head is deposited on the device 4 and, more specifically, on the deposit plate 10 thereof and while being supported thereby is held in such a position that its main axis extends in horizontal direction.

The rearward end of the drive shaft 15 of the tool head which drive shaft is to be coupled to the boring spindle 38 has a groove with a key 17. The follower flange 18 is slipped-on which takes along the shaft 15 when being rotated. Flange 18 is guided on drive shaft 15 by key 17, and is longitudinally displaceable. Screwed into the rear end of the follower flange 18 is the threaded flange 19 of the partially conical clamping bolt 20 the free end of which is provided with a threaded bore 21.

Distributed over the circumference of the housing wall 22 of housing 18 of the tool head 5 and arranged in the latter there are longitudinally displaceably mounted eight clamping bolts 23. The longitudinal displacement in outward direction of the clamping bolts 23 is effected against the thrust of springs 24. These springs 24 rest, on the one hand, against the housing wall 22 and, on the other hand, against bearings 25 which are connected to the clamping bolts 23. At the outer free ends of the clamping bolts 23, the latter are each provided with a conical flange 26 which has its free end connected to the counter bearing head 27. Those ends of the bolts 23 which extend into the housing 8 respectively extend into an associated recess 28 directed radially with regard to the axis of rotation of shaft 15 and engage the mantle surface of the head body 29 of a lever 30 which is pivotable about the axis 31. The lever 30 is at its free end provided with an adjusting screw 32 which is associated with the annular flange 33 on the follower flange 18.

On that end face of the headstock 7 which is associated with the tool head 5, the outer sleeve 16 of the carrier sleeve 6 and the boring spindle 38 are so designed that a fixed connection with the tool head 5 can be established. More specifically, the outer sleeve 16 has its front end provided with an annular flange 34 which is engaged by the clamping ring 35 on that side which faces the headstock 7. The clamping ring 35 furthermore extends around the outer sleeve 16 and is rotatable relative to the sleeve 16. In conformity with the arrangement of the clamping bolts 23 in the tool head 5, eight bores 36 and recesses 46 are distributed over the circumference of the annular flange 34 and the clamping ring 35. The opening width of these bores 36 and recesses 46 corresponds to the outer diameter of flange 26 and the counter bearing head 27 on the clamping bolts 23. Within outer sleeve 16 which is longitudinally but non-rotatably mounted in the housing 7, there is arranged the inner sleeve 37, while the boring spindle 38 is journalled in the inner sleeve 37. Boring spindle 38 and inner sleeve 37 can be clutched together in a non-illustrated manner so that they will rotate together or permit an individual rotation or a rotation independently of each other. The inner sleeve 37 of the outer sleeve 16 is at its free end provided with two follower blocks 39 which remain without function when utilizing a tool head 5 according to the described embodiment. The free end of the boring spindle 38 is provided with follower blocks 40 having associated therewith corresponding recesses 41 in the end face of the follower flange 18. When the follower blocks 40 engage the corresponding recesses 41, the driving connection between the working spindle 38 and the shaft 15 of the tool head 5 is established. The sleeve 42 is firmly inserted into and extends in the free end of the boring spindle 38. The inner contour of sleeve 42 precisely corresponds to the outer contour of the clamping bolts 20. The pull rod 43 extends in the longitudinal direction of the boring spindle 38 and pertains to a clamping device, for instance of a well known electric type, and has its free end provided with a thread 44 by means of which it may be screwed into the thread 21 of the clamping bolt 20.

Figure 4:
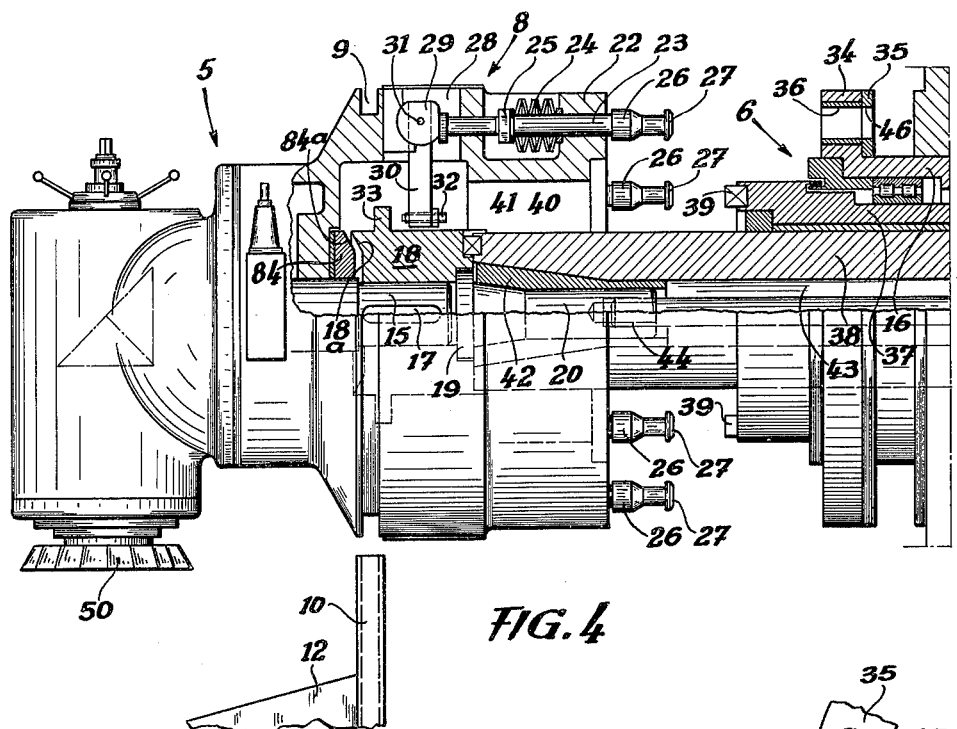
FIG. 4 illustrates in side view and partially in section the lifting off of a tool head from a device for placing the tool head in readiness for use, while the tool head is lifted off by means of the boring spindle moved out from the carrier sleeve of the headstock.
Figure 5:
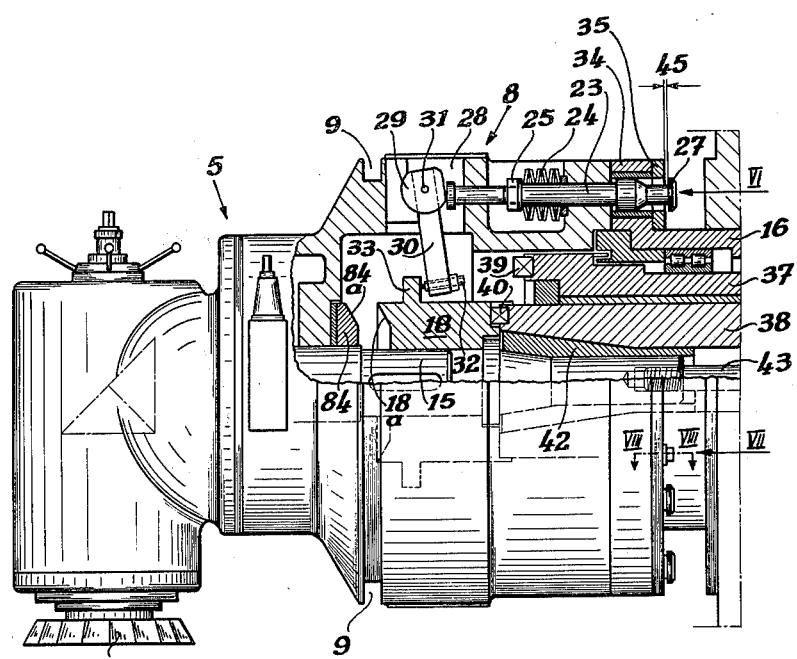
FIG. 5 shows the tool head of FIG. 4 in that position in which it is chucked to the carrier sleeve of the headstock.

FIG. 4 illustrates in detail how the tool head is received by the outer sleeve 16 of the carrier sleeve 6. Starting from the position which the tool head 5 and outer sleeve 16 occupy in the headstock 7 according to FIGS. 2 and 3, the boring spindle 38 is moved outwardly to such an extent that the follower blocks 40 engage the corresponding recesses 41 in the follower flange 18. When establishing the connection of the boring spindle 38 and of the outer sleeve 16 with the tool head 5, the boring spindle 38 displaces the follower flange 18 toward the left with regard to FIG. 2 when the follower blocks 40 do not engage the recesses 41. This movement of the follower flange 18 is effected in such a way that the conical surface 18a on flange 18 engages the counter surface 84a provided on ring 84, which ring is rotatable relative to shaft 15 and is located at a fixed point in the housing 22. In this way, also the tool head 5 is displaced in the same direction inasmuch as the deposit plate 10 which supports the tool head 5 moves correspondingly parallel to itself against the thrust of spring 78 (FIG. 11) as will be described in detail in connection with FIG. 11. When under these circumstances the boring spindle 38 is partially rotated during which the follower flange 18, in view of the frictional engagement of the conical surfaces 18a and 84a with each other, is at a standstill, the follower blocks 40 engage the recesses. Due to the force of spring 78 the deposit plate 10 and thus also the tool head 5 are moved correspondingly toward the right, namely by the depth of the recesses 41. Subsequently, also the free end provided with the thread 44 and pertaining to the pull rod 43 of the chucking device will by a corresponding rotation come into engagement with the thread 21 in the clamping bolt 20. Due to this cooperation, a precise centering of the axis of rotation of shaft 15 with regard to the axis of rotation of the boring spindle 38 is effected. This is due to the fact that the deposit plate 10 which, in conformity with FIG. 3, supports the tool head 5 will be able to deviate to a certain extent and will thus automatically set itself precisely so that the centering of the shaft 15 with regard to the boring spindle 38 will be assured. When the connection between the boring spindle 38 or the outer sleeve 16 with the tool head 5 is established as shown in FIG. 4, the headstock 7 will be moved upwardly on its stand 2 so that the deposit plate 10 frees the tool head 5 as shown in FIG. 4. This will then be followed by the connection of the tool head 5 to the outer sleeve 16, the details of which will be evident from FIG. 5.

Figure 6:
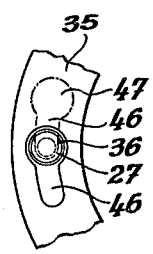
FIG. 6 illustrates on an enlarged scale the bayonet-like housing as seen in the direction of the arrow VI of FIG. 5.
Figure 7:
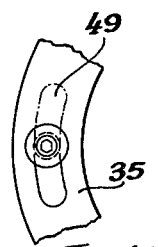
FIG. 7 illustrates on an enlarged scale a detail of the free end of the carrier sleeve as seen in the direction of the arrow VII of FIG. 5.
Figure 8:
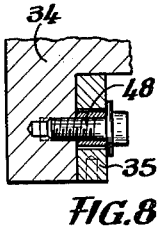
FIG. 8 illustrates in section the detail of FIG. 7, said section being taken along the line VIII — VIII of FIG. 5.
Figure 13:
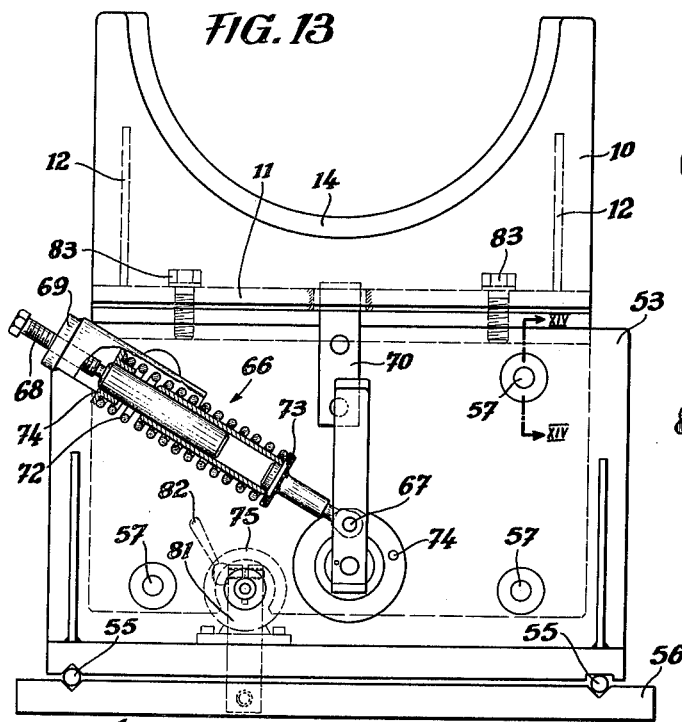
FIG. 13 illustrates a view of FIG. 11 as seen in the direction of the arrow XIII.
Figure 14:
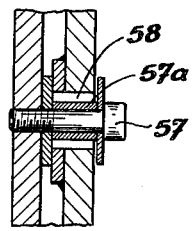
FIG. 14 is a section taken along the line XIV — XIV of FIG. 13, but on a larger scale than the latter.
Figure 15:
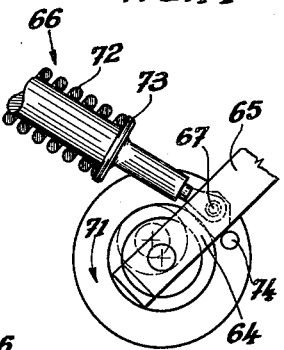
FIG. 15 is a view and partially a section through the adjusting eccentric of FIG. 12, but is shown on a larger scale than that of FIG. 12.

The boring spindle 38, which is shown in moved out position in FIG. 4, is pulled into the tool head 5 to such an extent that the end face of the follower flange 18 moves to the end face of the boring spindle 38 into which the clamping bolt 20 is pulled to such an extent that an aligning and chucking will be assured. By withdrawing the boring spindle 38, the follower flange 18 is displaced on drive shaft 15 in the direction toward the boring spindle 38. This adjustment brings about a tilting of the lever 30 by means of the adjusting bolt 32 so that the engaging head 29 of the lever 30 is pivoted whereby the clamping bolt 23 is displaced against the thrust of spring 24 by the slight distance 45 in the direction toward the headstock 7. When the tool head 5 is being tightened or when the follower flange 18 thereof is tightened against the boring spindle 38, the respective free end of the clamping bolt 23 has been moved into the bores 36 provided in flange 34 of the outer sleeve 16 and, more specifically, to such an extent that the counter bearing head 27 extends through the clamping ring 35. The passages in the clamping ring 35 which are associated with the bores 36 in flange 34 are designed as bayonet slots 46 so that after the head 27 has passed through the slot section 47, by turning the clamping ring 34, a position is obtainable in which a bayonet joint has been established with the counter bearing head 27; as illustrated in FIG. 6, a turning of the clamping ring 35 is possible without difficulties due to the fact that the play 45 was previously adjusted according to FIG. 5, which play was later eliminated as will be evident from FIG. 9 according to which, by returning the follower flange 18 in the direction toward the tool head 5, the lever 30 returns to its radial starting position. The springs 24 become in this connection effective so as to clamp the bolts 23 to the annular flange 34 or the clamping ring 35 on carrier sleeve 6. This return of the follower flange 18 is effected by a corresponding outward movement of the boring spindle 38 and the pull rod 43 which is arranged therein and pertains to the electric clamping device.

As mentioned above, the clamping ring 35 engages the annular flange 34 and at the same time extends around the outer mantle surface of the outer sleeve 16. In order to fix the position of the clamping ring 35 on the annular flange 34, the annular flange 34 may, by means of spacer screws 48, be so connected to the annular flange 34 of the outer sleeve 16 while being rotatable relative thereto that the spacer screws 48 extend through the clamping ring 35 through arc-shaped slots 49 and laterally fix the clamping ring.

As likewise mentioned above, according to FIG. 9, tool head 5 and outer sleeve 16 of the carrier sleeve 6 are braced relative to each other and are in the operative position in which the boring spindle 38 will be able by means of the follower flange 18 to drive the drive shaft 15 of tool head 5 and thereby the cutter 50 thereof.

FIG. 10 shows a special feature in connection with the chucking operation. According to this figure, it is provided that in corresponding recesses 51 springs 52 extend along an arc within the region of the engaging surfaces between the annular flange 34 and the clamping ring 35. One end of these springs rests through the intervention of a pin 52a on the annular flange 34 whereas the other end of these springs rests on an associated counter bearing surface on the clamping ring 35 so that in view of the thrust of springs 52 an automatic turning of the clamping ring 35 will occur when the clamping bolts 23 are located in the position shown in FIG. 5 and there is provided a play 45.

The detachment of the tool head 5 from the outer sleeve 16 of the headstock 7 is effected in such a way that the previously mentioned working steps occur in the reverse sequence. The loosening of the tool head 5 requires that the tool head is brought into a position in which, in conformity with FIG. 10, it can be deposited on the deposit plate 10. By lowering the tool head 5, in other words by downwardly displacing the headstock 7 on the stand 2, the tool head 5 will be located on the deposit plate 10 which with its arc-shaped rim 14 engages the groove 9 in housing 8 of the tool head 5 and thus extends half the way around the same from below.

As already mentioned, the deposit plate 10 is not stationarily arranged but is freely movable in its plane. Principally, the deposit plate 10 is by means of its bracket plate 13 resiliently suspended while an equalization of the weight to be absorbed by the deposit plate 10 is effected by means of a spring-urged device acting in the manner of a counter weight. The design of the device for depositing and placing the tool in readiness for use is shown in detail in FIGS. 11-15 which will now be described.

As mentioned above, the deposit plate 10 is connected to the horizontally extending plate 11 while reinforcing webs 12 are provided. The bracket plate 13 extends vertically downwardly. Connected to the plate 13 by means of screws 83 is the horizontally extending plate 11 and, more specifically, in such a way that the plate 11 is adjustable along a horizontal plane in a direction transverse to the bracket plate 13. The screws 83 extend through longitudinal slots in plate 11 and thus permit a displacement of plate 11 in such a manner that the bracket plate 13 extends in a plane which passes through the center of gravity of the tool head 5 on the deposit plate 10. The bracket plate 13 extends in a direction parallel to the stand plate 53 which latter is firmly connected to the ground plate 54 which in its turn by means of balls 55 movably rests on the foundation plate 56. The bracket plate 13 is screwed to the stand plate 53 in conformity with the showing of FIG. 14 and, more specifically, by spacer screws 57 which are respectively surrounded by bearing sleeves 57a and extend through the stand plate 53 through bores 58. The diameter of the bores 58 is greater than the outer diameter of the sleeve 57a so that the bracket plate 13 can be displaced in its plane by the respective play.

In conformity with FIGS. 11, 12, 13 and 15, the bearing bolt 59 is mounted in the stand plate 53. The bearing pivot 60 is eccentrically as adjusting eccentric mounted on the bearing bolt 59 on the side of the bracket plate 13. The pivot 60 supports the antifriction bearing 61 and together therewith is arranged in a bore provided in the bracket plate 13. A turning of the bearing bolt 59 thus brings about a pivoting of the bracket plate 13 and thereby of the deposit plate 10 in its plane, or a turning of the bearing bolt 59 brings about a movement of the bracket plate 13 in its plane. The bearing bolt 59 is journalled in the stand plate 53 by means of the antifriction bearing 62. Stand plate 53 comprises a bearing support 63 for receiving the antifriction bearing 62. Connected to the other end of the bearing bolt 59 is a lever arm 64 and a handle 65. Linked to the free end of the lever arm 64 and, more specifically, at 67 is a telescopic spring leg 66 which extends upwardly at an incline and has its free end resting on the counter bearing 69 by means of the adjusting screw 68. As illustrated in FIG. 11, the bearing 69 is firmly connected to the stand plate 53. The frame member 70 extending at the front side of the stand plate 53 is connected to plate 53 and serves for guiding the bracket plate 13 on the front side of plate 53. Assuming that the bearing bolt 59 occupies such a position that the bearing pivot 60, which is eccentric with regard to the axis of rotation of the bearing bolt 59, occupies the position indicated in FIG. 15 by dash lines, and furthermore assuming that the deposit plate 10 is loaded when receiving a tool head 5, this load brings about a turning of the bearing bolt 59 in the direction of the arrow 71. Simultaneously therewith, the lever 64 having the spring leg 66 linked thereto, is tilted upwardly so that a turning of the bearing bolt 59 makes it necessary that the spring force of the spring leg 66 is overcome which means that the spring 72 must be compressed between the two flanges 73 and 74 of the cooperating tubes of the spring leg 66. With increasing load acting upon the deposit plate 10, also the spring force of the spring leg increases correspondingly which spring force is, of course, to be designed in conformity with the expected loads, so that the deposit plate 10 can carry out slight tilting movements in its plane in conformity with the eccentric movement of the bearing pivot 60. These slight tilting movements will suffice to permit the centering between the outer sleeve 16 of the headstock 7 and the tool head 5 and the automatic alignment of the axes thereof with each other as soon as the boring spindle 38 cooperates with the follower flange 18, and simultaneously the clamping bolt 20 moves into the clamping sleeve 42 of the boring spindle 38 when the receiving of a tool head is involved.

In order to assure a definite starting position, a pin 74 is arranged on the bearing support 63, which pin 74 is engaged by the lever 64 in view of the force of the spring leg 66. In this position, in which the deposit plate 10 is under no load, the central axis of the arc-shaped rim strip 14 of plate 10 is fixed in the direction toward the top. The spring force is in association with the lever system (eccentricity, spring leg) so designed that the weight of the tool head is completely compensated for, which means that the device with the tool head 5 received thereby is within a certain region in vertical direction movable to any desired level.

As stated above, the ground plate 54 rests on the base plate 56 through the intervention of balls 55 so that also a slight adjustment of the entire device transverse to the longitudinal direction of the clamping plate 3 of the machine will be possible. Thus it is also possible, when depositing the tool head 5 on plate 10, to change the location of plate 10 in the direction toward the boring spindle axis by displacing the device 4 on the base plate 56 accordingly. In one starting position a locking is possible by means of the clamping device generally designated 75 which comprises the clamping support 81 and the clamping lever 82. The construction of this clamping device will be evident from FIG. 11. According to FIG. 11, a bar 76 engages the bracket plate 13 which is longitudinally displaceable relative to plate 13 and extends relative thereto in a direction perpendicular to the plate 13. Firmly connected to the bar 76 is a flange 77 against which rests one end of spring 78 while the other end of spring 78 rests against the flange 79 which is displaceable on the bar 76. Spring 78 is covered by the housing 80. If, for instance, the ground plate 54 which carries the entire device 4 is displaced on the base plate 56 toward the left with regard to FIG. 11, such displacement is effected against the thrust of spring 78 resting against flange 77 while also the housing 80 is displaced toward the left. A displacement of the ground plate 54 toward the left is thus possible only by overcoming the force of spring 78. On the other hand, spring 78 brings about a return of the device 4 as it is necessary when coupling the tool head 5 to the carrier sleeve 16 or to the boring spindle 38, unless from the very start the follower blocks 40 engage the associated recesses 41 as explained above. Thus the device is as far as the deposit plate 10 is concerned movable not only in the plane of plate 10 but also perpendicularly thereto in order to facilitate the deposit of a tool head 5 and to permit a certain automatic alignment of these parts with each other. In view of the fact that the deposit plate 10 can be slightly displaced in all directions, a self-centering of the device with regard to the axis of the boring spindle will be assured. Consequently, the outer sleeve 16 of the carrier sleeve 6 can by a corresponding setting of the tool heads be received automatically by or can be lifted off from the device 4.

These operations can thus be numerically controlled so that the tool exchange operations can be automatically effected which was heretofore not possible with heavy machine tools, for instance, in view of the great weight of the tools.

In conformity with FIG. 1, laterally of the clamping plate 3 there are arranged a total of three devices 4 for depositing and placing into readiness for use the tool heads 5, 5a and 5b respectively. In contrast thereto, FIGS. 16 and 17 show the arrangement of three devices 4 on a turntable 86 which is rotatable about the axis 98. The devices 4 are with their deposit plates 10 so arranged that by turning the turntable, one device each can be associated with the boring spindle 38 of the headstock 7 when the headstock 7 is together with the stand moved to one end of the stand bed 1. Correspondingly, the turntable 86 is arranged at one end of the plate 3. The arrangement of the devices on the turntable 86 has over the arrangement of FIG. 1 the advantage that less space is required so that the stand bed 1 can be shorter.

In addition to the three devices 4 for the depositing and placing into readiness for use the tool heads 5, the turntable 86 has rotatably arranged thereon a tool magazine 87 which in conformity with the illustrated embodiment serves for receiving and placing into readiness for use seven tools 90–96 which can be inserted into the tool heads placed into readiness for use in conformity with the respective requirements. To facilitate the tool exchange, a lifting device 88 with a beam 89 is arranged on the turntable 86. The equipment is longitudinally displaceably arranged on the beam 89 and serves for receiving the tools, which means the withdrawal of the tool from the magazine 87 and the movement of the tool to a tool head, and vice versa. The pivotable column of the lifting device 88 forms at the same time the column which rotatably supports the magazine 87. The devices 4 are designed as illustrated in and described in connection with FIGS. 11–15.

It is, of course, to be understood that the present invention is, by no means, limited to the specific showing in the drawings but also comprises any modifications within the scope of the appended claims.

What I claim is:

1. A heavy machine tool, especially boring and milling machine, which is adapted to selectively receive one of a plurality of tool heads having machining tool means mounted thereon, said machine tool including: a stand horizontally movable along a bed, a headstock vertically displaceably mounted on said stand, a supporting sleeve slidable in said headstock, a rotary boring spindle drive means having an axis of rotation arranged in said supporting sleeve, a pull rod operable chucking device arranged in said supporting sleeve for respectively driving and chucking a heavy tool head therein, said tool head comprising a housing adapted to be supported by said supporting sleeve and containing tool drive elements engageable with said spindle drive means, the outer peripheral surface of said housing being provided intermediate its ends with a circumferential circular groove located all around in a plane substantially perpendicular to the axis of rotation of said boring spindle, at least one device for the deposit of a tool head in readiness for use, said last mentioned device including a vertically standing holding plate means having an upper edge corresponding in contour to the said circular arc-shaped annular groove of said tool head and having a thickness corresponding to the width of said groove, said plate being adapted to receive and support said tool head by means of said groove, said device being located within the range of movement of the respective stand and tool head whereby the slide by movement with respect to said plate may deposit a tool head directly on said plate or engage a tool head while it is supported by said plate.

2. A machine tool according to claim 1, in which the region of movement of the tool head is determined by the displacement of at least one of said head stock, said supporting sleeve, and said stand.

3. A machine tool according to claim 1, which includes means for holding said deposit plate resiliently displaceably in its plane within a limited range.

4. A machine tool according to claim 1, which includes a turntable bearing pin, a horizontal bearing pivot eccentrically connected to said bearing pin and supporting said deposit plate, spring means, and lever means connected to said bearing pin and acted upon by said spring means, the magnitude of the force exerted by said spring means corresponding to the weight of a tool head to be supported by said deposit plate.

5. A machine tool according to claim 4, which includes abutment means, and in which said lever means includes a lever pivotable in downward and upward direction, the pivotal downward movement of said lever being limited by said abutment means, and the pivotal upward movement being yieldably opposed by said spring means.

6. A machine tool according to claim 4, which includes: a stand plate having said bearing pin journalled therein, a bracket plate extending along a plane substantially parallel to said deposit plate and being eccentrically arranged with regard to and supported by said bearing pin while being substantially parallel to said stand plate, said deposit plate being connected to said bracket plate so as to be displaceable transverse thereto and to be arrestable, and bolt means extending with play through said stand plate and guiding said bracket plate parallel to said stand plate.

7. A machine tool according to claim 4, which includes a base plate and a horizontal ground plate supporting said stand plate and displaceable on said base plate in a direction transverse to the plane of said deposit plane and adapted to be aligned with the axis of the boring spindle in conformity with the tool head.

8. A machine tool according to claim 7, which includes spring means associated with said ground plate for displacing said ground plate in the outward moving direction of said supporting sleeve and in opposite direction perpendicular to the plane of the deposit plate and relative to said base plate.

9. A machine tool according to claim 1, which includes a turntable, and a plurality of devices for depositing tools and placing the same in readiness for use.

10. A machine tool according to claim 9, which additionally includes a tool magazine.

11. A machine tool according to claim 10, which includes a lifting device having a pivotable supporting arm for transferring tools to said devices for depositing tools and for placing same in readiness for use and vice versa.

12. A machine according to claim 1, wherein said tool head includes a drive shaft for a milling head, a follower flange non-rotatably but longitudinally displaceably mounted on said drive shaft, said drive shaft being adapted to be coupled to said boring spindle by means of said follower flange and to be chucked by said chucking device, and clamping bolt means supported by said housing and operable at the same time at which said drive shaft is being coupled to said boring spindle to engage said supporting sleeve and to be chucked thereto.

13. A machine according to claim 12, in which said supporting sleeve has a free end provided with an annular flange, and which includes: a clamping ring engaging said annular flange at the side of said head stock, said clamping bolt means being provided with heads and said annular flange being provided with passages associated with said heads while said clamping ring has slots arranged in alignment with said passages and of such a shape that by turning said clamping ring after said heads extend through said slots a lock of the type of a bayonet joint is obtained.

14. A machine according to claim 12, which includes spring means respectively surrounding said clamping bolt means and urging the same in the direction away from said head stock, pivotable lever means engaging that end of said clamping bolt means which is remote from the head thereof, said follower flange being longitudinally displaceable by said boring spindle on said drive shaft to thereby bring about a tilting of said lever means so as to cause the latter to move the pertaining clamping bolt means against the thrust of said spring means slightly in the direction toward said head stock.

15. A machine according to claim 13, which includes spring means urging said clamping ring into interlocking position with said clamping bolt means.

* * * * *